(12) United States Patent
Stern

(10) Patent No.: US 7,047,537 B1
(45) Date of Patent: May 16, 2006

(54) CODE LINKING SYSTEM

(75) Inventor: Donald Stern, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,169

(22) Filed: Jan. 4, 2000

(51) Int. Cl.
G06F 3/00 (2006.01)
G06F 9/44 (2006.01)
G06F 9/46 (2006.01)
G06F 13/00 (2006.01)

(52) U.S. Cl. .................................... 719/331; 719/332
(58) Field of Classification Search ......... 709/310–332
See application file for complete search history.

(56) References Cited

U.S. PATENT DOCUMENTS 5,448,735 A * 9/1995 Anderson et al. ........... 709/100
5,781,797 A * 7/1998 Crick et al. .................. 710/10
5,835,749 A * 11/1998 Cobb .......................... 709/331
6,141,698 A * 10/2000 Krishnan et al. ............ 709/331
6,317,870 B1* 11/2001 Mattson, Jr. ................ 717/151
6,363,436 B1* 3/2002 Hagy et al. .................. 709/331
6,374,400 B1* 4/2002 Pickett ....................... 717/162

OTHER PUBLICATIONS

Munro, Writing DLLs for Windows using Visual Basic, part 1, PC Magazine, V11, n11, p379(6).*

* cited by examiner

Primary Examiner—William Thomson
Assistant Examiner—Diem Cao
(74) Attorney, Agent, or Firm—Beyer Weaver & Thomas LLP

(57) ABSTRACT

Methods and apparatus for linking a set of code modules for execution includes determining one or more code modules to be executed, ascertaining a hierarchical order in which the one or more code modules are to be executed, loading the one or more code modules to be executed, and building a chain connecting the one or more code modules such that the one or more code modules will automatically execute in the hierarchical order when a first one of the one or more code modules is executed.

34 Claims, 6 Drawing Sheets

CODE LINKING SYSTEM

FIELD OF THE INVENTION

The present invention relates generally to methods and apparatus for linking software modules for execution. More particularly, the present invention relates to methods and apparatus for linking software when the software modules are loaded rather than during compilation of the code modules.

BACKGROUND OF THE INVENTION

A dynamic link library (DLL) is a collection of programs or program files, any of which are typically called when needed by a larger main program. A DLL may contain source code to do a variety of functions. For instance, a DLL is often used to enable the main program to communicate with a specific device such as a printer or scanner.

One advantage of DLLs is that since they are not loaded into random access memory (RAM) with the main program, space is saved in RAM. Rather, when and if a DLL is needed, then it is loaded and run. For example, when a user is editing a document, the printer DLL need not be loaded into RAM. If the user decides to print the document, then the word processing application causes the printer DLL to be loaded and run. The same DLL can be shared between several tasks rather than each task containing copies of the routines it uses.

A DLL is an executable file that traditionally cannot be run independently. In other words, a DLL can only be run by being called from another executable file. This is typically accomplished through subroutine calls. For instance, the executable for the main program may be compiled with a library of "stubs" which allow link errors to be detected at compile-time. Then, at run-time, the library calls may be patched with the addresses of the real shared library routines, possibly via a jump table. The use of subroutine calls is disadvantageous for several reasons. First, there is a substantial amount of overhead involved in calling each subroutine and returning to the main program. Second, maintenance of the jump table and the time to perform a lookup in the jump table is substantial. Third, it is important that the correct version of the libraries be linked. Since linking is performed during compile-time, code modifications of the libraries typically requires recompilation to link the correct versions of the libraries.

An alternative to performing subroutine calls is to make library calls part of the operating system kernel and enter each of them via a trap instruction. However, similar to the use of subroutine calls, this alternative requires a call and return for each library call. Accordingly, this is generally as inefficient as an ordinary subroutine call.

In view of the above, it would be desirable if a mechanism for linking DLLs to reduce the required execution time were developed. Moreover, it would be desirable if DLLs could be linked such that re-compilation were not required upon modification of the DLLs.

SUMMARY OF THE INVENTION

An invention is described herein that links DLLs for execution. Rather than calling DLLs from a main program or through the use of separate trap instructions, the DLLs are linked together in the order of execution. This is accomplished when the DLLs are loaded rather than during compilation or execution.

In addition to linking DLLs, the present invention may be used to link executable code in a variety of systems and for a variety of uses. One method of linking a set of code modules for execution includes determining one or more code modules to be executed. Next, a hierarchical order in which the one or more code modules are to be executed is ascertained. The one or more code modules to be executed are then loaded, and a chain connecting the one or more code modules is built. Once the chain is built, the code modules will automatically execute in the hierarchical order when a first one of the one or more code modules is executed.

A module that is shared by more than one chain has an option of executing multiple code modules once its execution has completed. In accordance with one aspect of the invention, building the chain involves obtaining a first one of the one or more code modules that have been loaded. Next, it is determined whether the first one of the one or more code modules can subsequently execute a second one of the one or more code modules upon completion of execution of the first one of the one or more code modules. In other words, the second code module may be executed depending upon the chain which is followed during execution. When it is determined that the first one of the one or more code modules can subsequently execute a second one of the one or more code modules, a branch table associated with the first one of the one or more code modules is updated to identify an entry point of the second one of the one or more code modules. This process is performed for each potential chain of execution and for each module so that entry points for all potential routes are stored in the appropriate branch tables.

According another aspect of the invention, the present invention is used to configure a hardware interface. More particularly, a desired configuration is compared with a set of rules which specify an associated set of DLLs and a hierarchical order in which the set of DLLs may be executed. The configuration is compared to the set of rules to obtain the set of DLLs and the hierarchical order. The set of DLLs is then loaded and a chain is built that connects the set of DLLs in the appropriate order of execution.

The present invention may be advantageously used to link code modules such as DLLs for execution. Since the code modules need not be called by a main program, the time that is typically required to call each code module and return to the main program is eliminated. Moreover, since linking is performed during load time, it is unnecessary to recompile the code modules when modified code modules are loaded.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention provides a code linking system which may be used to link code modules when the code modules are loaded. In the following description, the present invention is described with reference to DLLs. However, the present invention may be used to load and link other code modules to minimize the speed of execution of the code modules.

Figure 1:
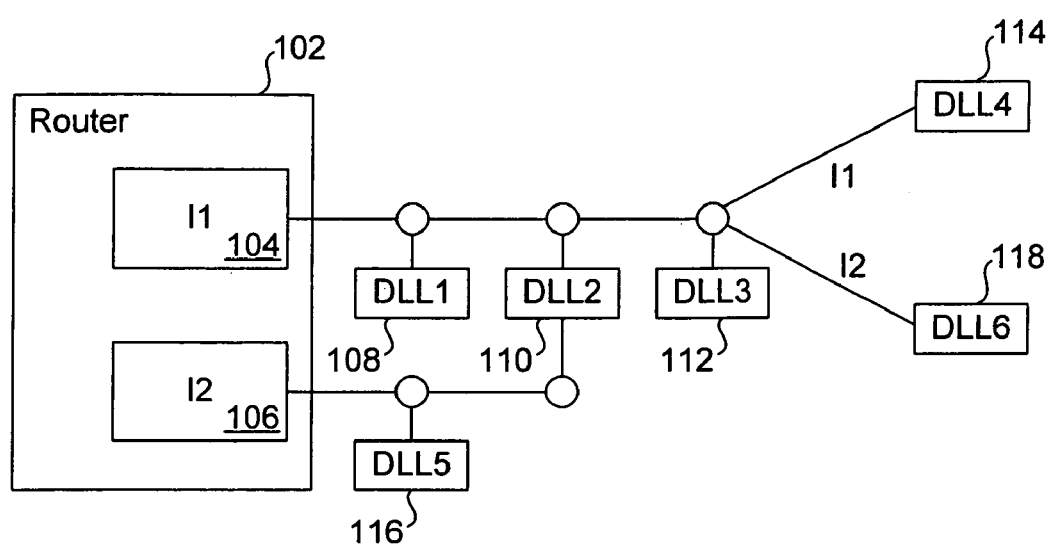
FIG. 1 is a block diagram illustrating an exemplary system in which the present invention may be implemented.

Referring to FIG. 1, an exemplary system in which the present invention may be implemented is illustrated. As shown, a router 102 includes a first interface 104 and a second interface 106. During configuration of the router 102, the first interface 104 and the second interface 106 may be configured to support a variety of desired functions. As one example, it may be desirable to specify that the interfaces 104 and 106 are Ethernet interfaces and that encryption is desired. As another example, it may be desirable to limit the number of packets (e.g., via an access list) that may be forwarded or received by the interfaces 104 and 106. During configuration of each of the interfaces 104 and 106, the configuration is typically accomplished through the loading and execution of a set of DLLs corresponding to the desired functions to be supported by the respective interface. Moreover, it is typically necessary to execute the set of DLLs in a specific order that permits proper functioning of the interfaces 104 and 106.

Rather than calling each of the set of DLLs from a main program in the proper order, the present invention builds an executable chain of DLLs as appropriate for each interface. As shown in FIG. 1, a first executable chain of DLLs is built for the first interface 104. More particularly, the first executable chain of DLLs includes a first DLL (DLL1) 108, a second DLL (DLL2) 110, a third DLL (DLL3) 112, and a fourth DLL (DLL4) 114. Once the chain is built, execution of the DLLs in the chain is initiated at the first DLL in the chain, DLL1 108, when a hardware interrupt is received. Similarly, a second executable chain of DLLs is built for the second interface 106. As shown, the second executable chain of DLLs includes a fifth DLL (DLL5) 116, the second DLL (DLL2) 110, the third DLL (DLL3) 112, and a sixth DLL (DLL6) 118. Thus, the second DLL (DLL2) 110 and the third DLL (DLL3) 112 are shared by both executable chains of DLLs. It is important to note that the DLLs in each of the executable chains will automatically execute in the appropriate order when the first DLL of the chain is executed rather than being called successively by a main program. One method of building an executable chain will be described in further detail with reference to FIG. 3 and FIG. 4.

Figure 2A:
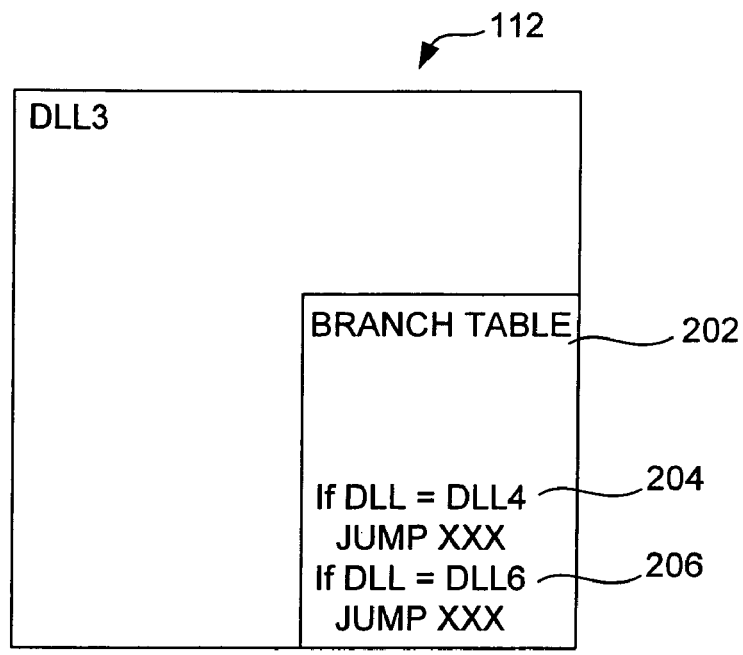
FIG. 2A is a diagram illustrating the inclusion of a branch table in the third DLL 112 shown in FIG. 1.

In accordance with one embodiment of the invention, in order to create an executable chain connecting one or more DLLs, a branch table is provided in each parent DLL to enable each child DLL to subsequently be called. For instance, the third DLL 112 shown in FIG. 1 has the option of calling the fourth DLL 114 and the sixth DLL 118 depending upon which chain is being executed (i.e., which interface initiated execution). FIG. 2A is a diagram illustrating the inclusion of a branch table 202 in a parent DLL, the third DLL 112 of FIG. 1. Each parent DLL may be created to include a dummy address associated with each possible child DLL that may be executed. More particularly, as shown, in a first entry 204 of the branch table 202, if the child DLL to be executed is determined to be the fourth DLL (DLL4), a branch or jump instruction is provided with a dummy address, shown here to be "XXX." Similarly, in a second entry 206 of the branch table 202, if the child DLL to be executed is determined to be the sixth DLL (DLL6), a branch or jump instruction is provided with another dummy address.

Figure 2B:
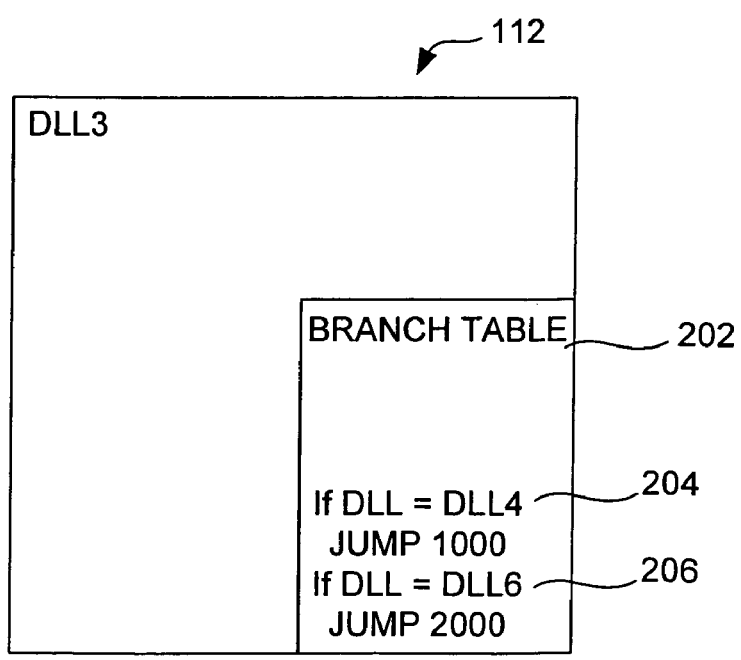
FIG. 2B is a diagram illustrating the updating of the branch table provided in the third DLL 112 as shown in FIG. 2A.

Upon loading of the DLLs, branch tables of the parent DLLs are updated as appropriate to replace dummy addresses with entry points of the appropriate child DLLs. FIG. 2B is a diagram illustrating the updating of the branch table provided in the parent DLL, the third DLL 112 of FIG. 1. As shown, the branch table 202 is updated to include an entry in the branch table 202 that identifies an entry point of one of the child DLLs. More particularly, the branch table 202 is updated such that the appropriate dummy address is replaced with an entry point of the corresponding child DLL. As shown in FIG. 2B in the first entry 204, when the child DLL to be called is the fourth DLL, DLL4, the jump address is "1000." However, as shown in the second entry 206, when the child DLL to be called is the sixth DLL, DLL6, the jump address is "2000." Thus, when the parent DLL is shared by two or more executable chains of DLLs, each child DLL is associated with one of the executable chains. In other words, it is necessary to specify which entry in the branch table is to be executed next when more than one entry exists in the branch table. This may be accomplished, for example, by associating a particular parameter with each of the executable chains.

Figure 3:
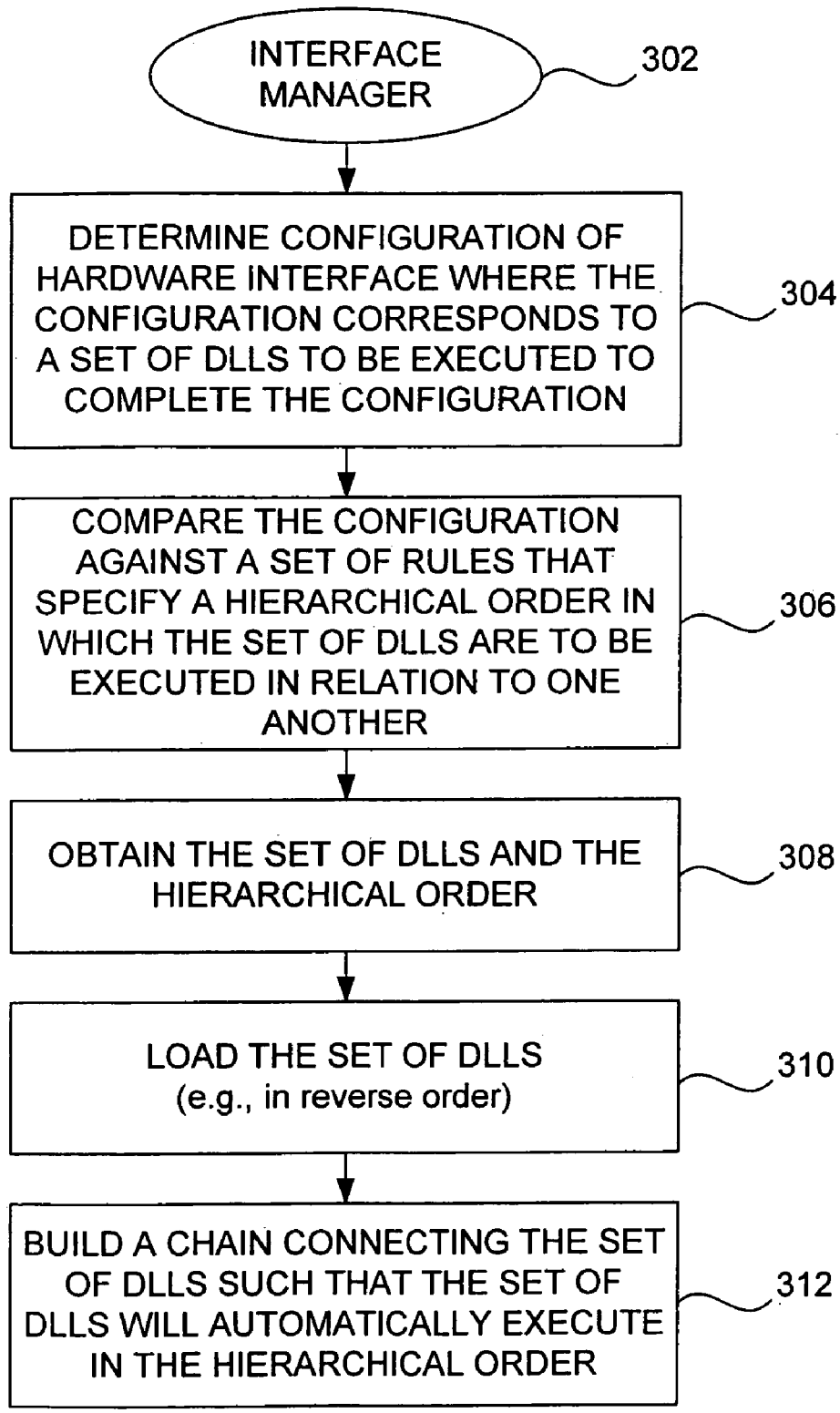
FIG. 3 is a process flow diagram illustrating one implementation of an interface manager in accordance with an embodiment of the invention.
Figure 4:
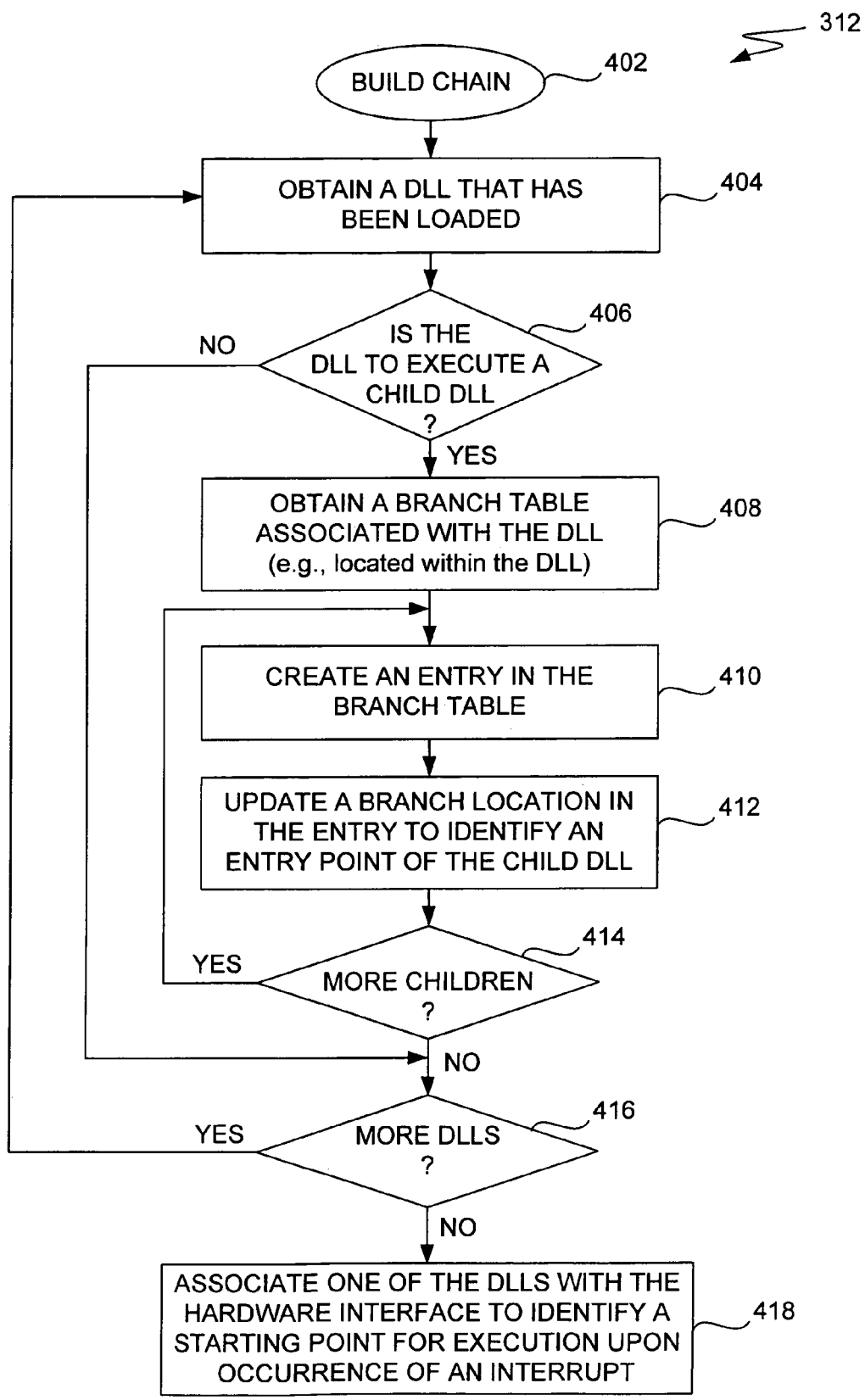
FIG. 4 is a process flow diagram illustrating one method of building a chain connecting a set of DLLs such that they will automatically execute in the hierarchical order as shown at block 312 of FIG. 3.

According to one embodiment of the present invention, an executable chain of DLLs is created in the context of configuration of hardware interfaces performed by what is referred to as an "interface manager." FIG. 3 is a process flow diagram illustrating one implementation of an interface manager. The process begins at block 302. The interface manager then determines the DLLs that are to be executed and the order in which they are to be executed so that the DLLs may be loaded and a chain may be built. More particularly, at block 304, the interface manager determines a desired configuration of a hardware interface. For instance, the type of hardware interface may be determined and an associated desired configuration may be read. The configuration corresponds to a set of DLLs to be executed to complete the configuration. In order to determine the set of DLLs to be executed and the order in which they are to be executed in order to configure the interface, the configuration is compared against a set of rules that specify a hierarchical order in which the set of DLLs are to be executed in relation to one another at block 306. The set of DLLs and the hierarchical order may then be obtained at block 308. The set of DLLs are then loaded at block 310. It is preferable to build the chain while the set of DLLs is being loaded. Since it may be desirable to build the chain in the reverse order of the hierarchical order of execution, the set of DLLs may be loaded in the reverse order of the hierarchical order of execution. In this manner, a chain connecting the set of DLLs is built at block 312 such that the set of DLLs will automatically execute in the hierarchical order when a first one of the one or more code modules is executed.

Once the chain is built, the set of DLLs may be executed without requiring a main program (e.g., parent code module) responsible for calling each of the DLLs. Moreover, since the chain is built when the DLLs are loaded, the DLLs can be modified without requiring recompilation. One method of building a chain connecting a set of DLLs such that they will automatically execute in the hierarchical order as shown at block 312 of FIG. 3 is described with reference to FIG. 4. The process begins at block 402 and at block 404, one of the DLLs that has been loaded is obtained. Next, at block 406, it is determined whether the obtained DLL is to subsequently execute another one of the loaded DLLs (i.e., a child DLL). Alternatively, the obtained DLL may merely have the option of executing the child DLL, since it may also have the option of executing another child DLL associated with another executable chain.

When it is determined at block 406 that the obtained DLL is to subsequently execute another child DLL, a branch table is updated at blocks 408 through 412. More particularly, at block 408, a branch table associated with the obtained DLL is obtained. As described above with reference to FIG. 2A and FIG. 2B, the branch table may be located within the parent DLL. At block 410, an entry is created in the branch table and at block 412, a branch location in the entry is updated to identify an entry point of the child DLL. For instance, a dummy address established when the DLLs were created may be replaced with the appropriate entry point of the child DLL.

As described above, a parent DLL may be associated with multiple possible executable chains of DLLs. It is therefore important to provide an entry in the branch table for each child DLL associated with each possible executable chain of DLLs. Thus, at block 414, it is determined whether there are more child DLLs that can be executed upon completion of execution of the parent DLL. If there are more child DLLs that can be called upon completion of execution of the parent DLL, the process loops to repeat blocks 410 and 412 to create an entry with the appropriate entry point for each child DLL representing a potential execution route along an executable chain of DLLs.

If it is determined at block 414 that there are no more child DLLs that may be executed upon completion of the parent DLL, the process continues at block 416. Moreover, if the DLL obtained at block 406 is not to subsequently execute another DLL, a branch table need not be created for the obtained DLL and the process continues at block 416. If it is determined at block 416 that there are more DLLs, another DLL may be obtained at block 404 and the process repeats for that DLL. Otherwise, an executable chain of DLLs has been built. It is then desirable to associate the executable chain with a hardware interface. Thus, one of the DLLs is associated with the appropriate hardware interface at block 418 in order to identify a starting point for execution of the chain upon occurrence of an interrupt.

As described above, if more than one executable chain of DLLs has been created, each DLL that is not shared by multiple chains is associated with one of the executable chains so that the appropriate chain is executed upon the occurrence of an interrupt. As one example, this may be accomplished through associating a parameter with a chain which may be provided down the chain or only to those DLLs that are shared by two chains. In this manner, a "shared DLL" may determine the next "non-shared DLL" to execute. As another example, a common block of code may be provided which provides the necessary information to distinguish the executable chains from one another.

Figure 5:
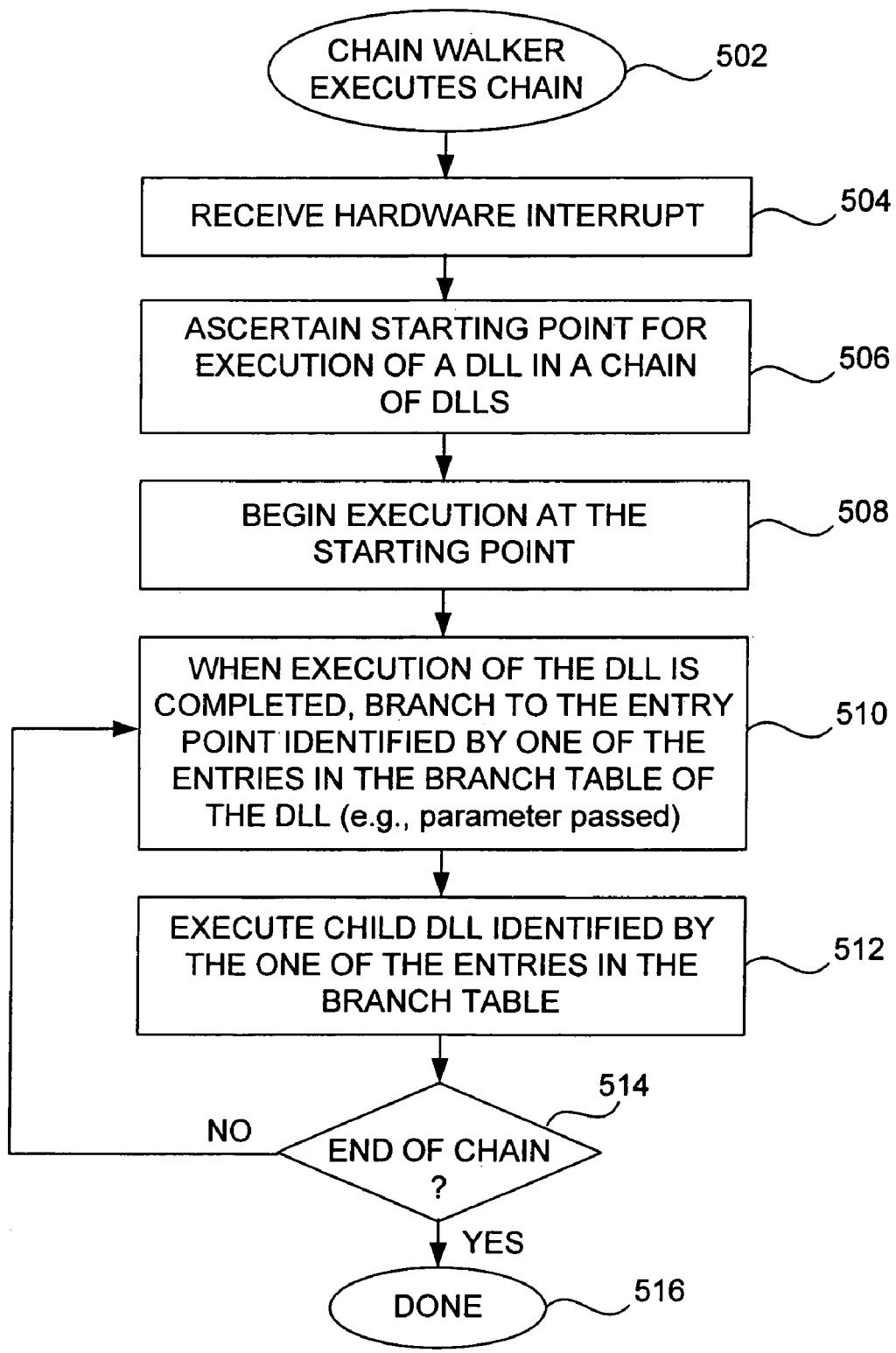
FIG. 5 is a process flow diagram illustrating one method of executing a single chain of DLLs.

In accordance with one embodiment of the invention, once an executable chain of DLLs has been created, it is executed upon the occurrence of a hardware interrupt. FIG. 5 is a process flow diagram illustrating one method of executing a single chain of DLLs by a "chain walker." The process begins at block 502 and at block 504 a hardware interrupt is received. A starting point for execution of a first DLL in a chain of DLLs is ascertained at block 506. Execution is then initiated at this starting point at block 508. When execution of the DLL is completed, a branch or jump is performed to the entry point identified by the appropriate one of the entries in the branch table at block 510. For instance, when the DLL that has most recently been executed is a DLL that is shared by two or more executable chains of DLLs, a parameter or other mechanism may be used to determine the next child DLL to be executed. Once the next DLL to be executed is identified, this child DLL associated with one of the entries in the branch table is executed at block 512. If it is determined at block 514 that the end of the chain has been reached, the process ends at block 516. Otherwise, the process continues at block 510 for the remaining DLLs in the chain.

Generally, the code linking technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid code linking system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the code linking system of this invention may be specially configured routers such as specially configured router models 1600, 2500, 2600, 3600, 4500, 4700, 7200, 7500, and 12000 and Catalyst switches such as models 5000 and 6000 available from Cisco Systems, Inc. of San Jose, Calif. A general architecture for some of these machines will appear from the description given below. In an alternative embodiment, the code linking system may be implemented on a general-purpose network host machine such as a personal computer or workstation. Further, the invention may be at least partially implemented on a card (e.g., an interface card) for a network device or a general-purpose computing device.

Figure 6:
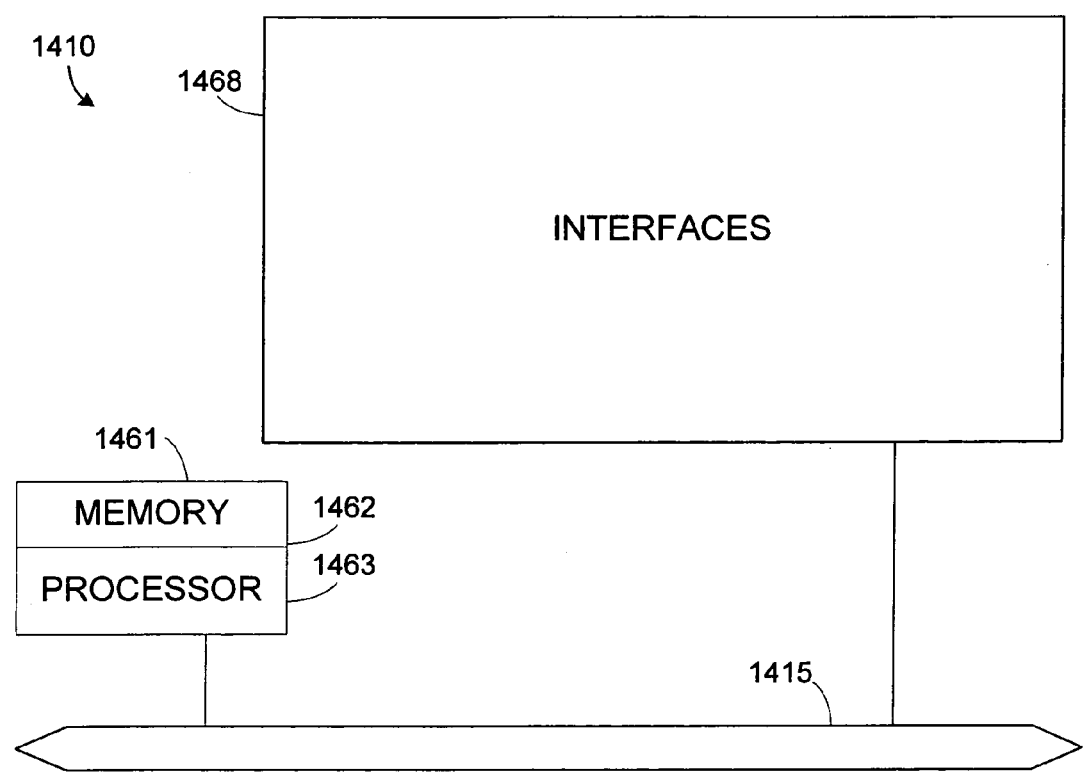
FIG. 6 is a block diagram of a network device that may be configured to implement aspects of the present invention.

Referring now to FIG. 6, a router 1440 suitable for implementing the present invention includes a master central processing unit (CPU) 1462, interfaces 1468, and a bus 1415 (e.g., a PCI bus). When acting under the control of appropriate software or firmware, the CPU 1462 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 1462 may include one or more processors 1463 such as a processor from the Motorola family of microprocessors or the MIPS family of microprocessors. In an alternative embodiment, processor 1463 is specially designed hardware for controlling the operations of router 1440. In a specific embodiment, a memory 1461 (such as non-volatile RAM and/or ROM) also forms part of CPU 1462. However, there are many different ways in which memory could be coupled to the system.

The interfaces 1468 are typically provided as interface cards (sometimes referred to as "line cards"). Generally, they control the sending and receiving of data packets over the network and sometimes support other peripherals used with the router 1440. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1462 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1461) configured to store program instructions for the general-purpose network operations and other code linking functions described herein. The program instructions may control the operation of an operating system and/or one or more applications, for example. The memory or memories may also be configured to store code modules (e.g., DLLs) that include branch tables created during the loading of the code modules.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention may be implemented on any suitable computer system. Moreover, the present invention may be stored in any suitable memory. For instance, the present invention may be implemented on random access memory (RAM) such as SRAM or DRAM, read only memory (ROM), or other suitable computer readable medium.

Although illustrative embodiments and applications of this invention are shown and described herein, many variations and modifications are possible which remain within the concept, scope, and spirit of the invention, and these variations would become clear to those of ordinary skill in the art after perusal of this application. As one example, although the described embodiment creates an executable chain of DLLs in the context of configuration of a hardware device, the present invention may be used to link any set of code modules or files for execution. Accordingly, the present embodiments are to be considered as illustrative and not restrictive, and the invention is not to be limited to the details given herein, but may be modified within the scope and equivalents of the appended claims.

What is claimed is:

1. A computerized method of linking a set of code modules for execution, comprising:

determining one or more code modules to be executed, wherein the one or more code modules are one or more DLLs;

ascertaining a hierarchical order in which the one or more code modules are to be executed;

loading the one or more code modules to be executed; and building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;

wherein building a chain connecting the one or more code modules comprises:

obtaining the first one of the one or more code modules, wherein the first one of the one or more code modules has previously been loaded;

determining whether the first one of the one or more code modules is to subsequently execute a second one of the one or more code modules upon completion of execution of the first one of the one or more code modules, wherein the second one of the one or more code modules has previously been loaded;

when it is determined that the first one of the one or more code modules is to subsequently execute a second one of the one or more code modules, updating a branch table of the first one of the one or more code modules to identify an address at which the second one of the one or more code modules is loaded such that the reference to the second one of the one or more code modules in the branch table of the first one of the one or more code modules is associated with the address at which the second one of the one or more code modules is loaded.

2. The method as recited in claim 1, wherein the loading step is performed simultaneous with the building step.

3. The method as recited in claim 1, further comprising:
repeating the obtaining, determining and updating steps for each of the code modules.

4. A computerized method of linking a set of code modules for execution, comprising:
determining one or more code modules to be executed, wherein the one or more code modules are one or more DLLs;
ascertaining a hierarchical order in which the one or more code modules are to be executed;
loading the one or more code modules to be executed; and
building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein building a chain connecting the one or more code modules comprises:
obtaining the first one of the one or more code modules;
determining whether the first one of the one or more code modules has an option of executing a second one of the one or more code modules upon completion of execution of the first one of the one or more code modules;
when it is determined that the first one of the one or more code modules has an option of executing a second one of the one or more code modules, updating a branch table in the first one of the one or more code modules to identify an address at which second one of the one or more code modules is loaded such that the address of the second one of the one or more code modules is associated with the reference to the second one of the one or more code modules.

5. The method as recited in claim 4, wherein the loading step is performed simultaneous with the building step.

6. The method as recited in claim 4, wherein building a chain is performed such that the one or more code modules can be modified without requiring recompilation of the one or more code modules.

7. The method as recited in claim 4, wherein loading the one or more code modules is performed in a reverse order of the hierarchical order.

8. The method as recited in claim 4, wherein determining one or more code modules to be executed comprises determining one or more code modules to be executed to complete configuration of a hardware interface of a router.

9. The method as recited in claim 4, wherein determining one or more code modules to be executed comprises determining one or more code modules to be executed to configure a router.

10. The method as recited in claim 4, further comprising associating one of the one or more code modules with a hardware interface to identify a starting point for execution upon occurrence of an interrupt.

11. The method as recited in claim 4, wherein updating the branch table in the first one of the one or more code modules comprises:
updating a conditional branch or jump instruction identifying the second one of the one or more code modules to include the address of the second one of the one or more code modules.

12. The method as recited in claim 11, wherein updating the conditional branch or jump instruction comprises:
replacing a dummy address in the conditional branch or jump instruction with the address of the second one of the one or more code modules.

13. The method as recited in claim 11, wherein the conditional branch or jump statement identifying the second one of the one or more code modules is executed when the second one of the code modules in the chain identified in the conditional branch or jump statement is executed.

14. The method as recited in claim 4, wherein the loading step is performed simultaneous with the building step.

15. The method as recited in claim 4, further comprising:
repeating the obtaining, determining and updating steps for each of the code modules.

16. A computerized method of linking a set of code modules for execution, comprising:
determining one or more code modules to be executed, wherein the one or more code modules are one or more DLLs;
ascertaining a hierarchical order in which the one or more code modules are to be executed;
loading the one or more code modules to be executed; and
building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein building a chain connecting the one or more code modules comprises:
obtaining the first one of the one or more code modules;
determining whether the first one of the one or more code modules can subsequently execute a second one of the one or more code modules upon completion of execution of the first one of the one or more code modules;
when it is determined that the first one of the one or more code modules can subsequently execute a second one of the one or more code modules, updating a branch table in the first one of the one or more code modules to identify an address at which the second one of the one or more code modules has been loaded such that the address of the second one of the one or more code modules is associated with the reference to the second one of the one or more code modules.

17. The method as recited in claim 16, wherein the branch table of the first one of the one or more code modules includes the reference to the second one of the one or more code modules prior to loading the code modules and includes the address of the second one of the one or more code modules after the code modules have been loaded.

18. The method as recited in claim 16, wherein updating a branch table includes modifying an entry in the branch table such that a dummy address is replaced with the address of the second one of the one or more code modules.

19. The method as recited in claim 16, wherein when the first one of the one or more code modules is shared by two or more executable chains of code modules, associating the second one of the one or more code modules with one of the two or more executable chains such that the branch table of the first one of the one or more code modules includes at least two entries, each of the entries identifying one of the two or more executable chains, each of the entries including an address.

20. The method as recited in claim 19, wherein the second one of the one or more code modules is associated with one of the two or more executable chains when a parameter is associated with one of the two or more executable chains such that each of the entries further includes a parameter used to select one of the two or more executable chains.

21. The method as recited in claim 16, wherein updating the branch table further includes replacing a dummy address associated with the reference to the second one of the one or more code modules with the address of the second one of the one or more code modules.

22. The method as recited in claim 16, wherein updating a branch table in the first one of the one or more code modules to identify an address at which the second one of the one or more code modules has been loaded such that the address of the second one of the one or more code modules is associated with the reference to the second one of the one or more code modules comprises:
updating a conditional branch or jump instruction identifying the second one of the one or more code modules to include the address of the second one of the one or more code modules.

23. The method as recited in claim 22, wherein the conditional branch or jump statement identifying the second one of the one or more code modules is executed when the second one of the code modules in the chain identified in the conditional branch or jump statement is executed.

24. The method as recited in claim 16, wherein the loading step is performed simultaneous with the building step.

25. The method as recited in claim 16, further comprising:
repeating the obtaining, determining and updating steps for each of the code modules.

26. A tangible computer-readable medium storing thereon computer-readable instructions for linking a set of code modules for execution, comprising:
instructions for determining one or more code modules to be executed, wherein the one or more code modules are one or more DLLs;
instructions for ascertaining a hierarchical order in which the one or more code modules are to be executed;
instructions for loading the one or more code modules to be executed; and
instructions for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the instructions for building a chain connecting the one or more code modules includes:
instructions for obtaining the first one of the one or more code modules, wherein the first one of the one or more code modules has previously been loaded;
instructions for determining whether the first one of the one or more code modules is to subsequently execute a second one of the one or more code modules upon completion of execution of the first one of the one or more code modules, wherein the second one of the one or more code modules has previously been loaded; and
instructions for updating a branch table of the first one of the one or more code modules to identify an address at which the second one of the one or more code modules is loaded such that the reference to the second one of the one or more code modules in the branch table of the first one of the one or more code modules is associated with the address at which the second one of the one or more code modules is loaded when it is determined that the first one of the one or more code modules is to subsequently execute a second one of the one or more code modules.

27. An apparatus for linking a set of code modules for execution, comprising:
means for determining one or more code modules to be executed, wherein the one or more code modules are one or more DLLs;
means for ascertaining a hierarchical order in which the one or more code modules are to be executed;
means for loading the one or more code modules to be executed; and
means for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the means for building a chain connecting the one or more code modules includes:
means for obtaining the first one of the one or more code modules, wherein the first one of the one or more code modules has previously been loaded;
means for determining whether the first one of the one or more code modules is to subsequently execute a second one of the one or more code modules upon completion of execution of the first one of the one or more code modules, wherein the second one of the one or more code modules has previously been loaded; and
means for updating a branch table of the first one of the one or more code modules to identify an address at which the second one of the one or more code modules is loaded such that the reference to the second one of the one or more code modules in the branch table of the first one of the one or more code modules is associated with the address at which the second one of the one or more code modules is loaded when it is determined that the first one of the one or more code modules is to subsequently execute a second one of the one or more code modules.

28. An apparatus for linking a set of code modules for execution, comprising:
a processor; and
a memory, at least one of the processor and the memory being adapted for:
determining one or more code modules to be executed, wherein the one or more code modules are one or more DLLs;
ascertaining a hierarchical order in which the one or more code modules are to be executed;
loading the one or more code modules to be executed; and
building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein building a chain connecting the one or more code modules includes:
obtaining the first one of the one or more code modules, wherein the first one of the one or more code modules has previously been loaded;
determining whether the first one of the one or more code modules is to subsequently execute a second one of the one or more code modules upon completion of execution of the first one of the one or more code modules, wherein the second one of the one or more code modules has previously been loaded; and
when it is determined that the first one of the one or more code modules is to subsequently execute a second one of the one or more code modules, updating a branch table of the first one of the one or more code modules to identify an address at which the second one of the one or more code modules is loaded such that the reference to the second one of the one or more code modules in the branch table of the first one of the one or more code modules is associated with the address at which the second one of the one or more code modules is loaded.

29. A tangible computer-readable medium storing thereon computer-readable instructions for linking a set of code modules for execution, comprising:
instructions for determining one or more code modules to be executed, wherein the one or more code modules are one or more DLLs;
instructions for ascertaining a hierarchical order in which the one or more code modules are to be executed;
instructions for loading the one or more code modules to be executed; and
instructions for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the instructions for building a chain connecting the one or more code modules includes:
instructions for obtaining the first one of the one or more code modules;
instructions for determining whether the first one of the one or more code modules has an option of executing a second one of the one or more code modules upon completion of execution of the first one of the one or more code modules; and
instructions for updating a branch table in the first one of the one or more code modules to identify an address at which second one of the one or more code modules is loaded such that the address of the second one of the one or more code modules is associated with the reference to the second one of the one or more code modules when it is determined that the first one of the one or more code modules has an option of executing a second one of the one or more code modules.

30. An apparatus for linking a set of code modules for execution, comprising:
means for determining one or more code modules to be executed, wherein the one or more code modules are one or more DLLs;
means for ascertaining a hierarchical order in which the one or more code modules are to be executed;
means for loading the one or more code modules to be executed; and
means for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the means for building a chain connecting the one or more code modules includes:
means for obtaining the first one of the one or more code modules;
means for determining whether the first one of the one or more code modules has an option of executing a second one of the one or more code modules upon completion of execution of the first one of the one or more code modules; and
means for updating a branch table in the first one of the one or more code modules to identify an address at which second one of the one or more code modules is loaded such that the address of the second one of the one or more code modules is associated with the reference to the second one of the one or more code modules when it is determined that the first one of the one or more code modules has an option of executing a second one of the one or more code modules.

31. An apparatus for linking a set of code modules for execution, comprising:
a processor; and
a memory, at least one of the processor and the memory being adapted for:
determining one or more code modules to be executed, wherein the one or more code modules are one or more DLLs;
ascertaining a hierarchical order in which the one or more code modules are to be executed;
loading the one or more code modules to be executed; and
building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein building a chain connecting the one or more code modules includes:
obtaining the first one of the one or more code modules;
determining whether the first one of the one or more code modules has an option of executing a second one of the one or more code modules upon completion of execution of the first one of the one or more code modules; and
when it is determined that the first one of the one or more code modules has an option of executing a second one of the one or more code modules, updating a branch table in the first one of the one or more code modules to identify an address at which second one of the one or more code modules is loaded such that the address of the second one of the one or more code modules is associated with the reference to the second one of the one or more code modules.

32. A tangible computer-readable medium storing thereon computer-readable instructions for linking a set of code modules for execution, comprising:
instructions for determining one or more code modules to be executed, wherein the one or more code modules are one or more DLLs;
instructions for ascertaining a hierarchical order in which the one or more code modules are to be executed;
instructions for loading the one or more code modules to be executed; and
instructions for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the instructions for building a chain connecting the one or more code modules includes:
instructions for obtaining the first one of the one or more code modules;
instructions for determining whether the first one of the one or more code modules can subsequently execute a second one of the one or more code modules upon completion of execution of the first one of the one or more code modules; and
instructions for updating a branch table in the first one of the one or more code modules to identify an address at which the second one of the one or more code modules has been loaded such that the address of the second one of the one or more code modules is associated with the reference to the second one of the one or more code modules when it is determined that the first one of the one or more code modules can subsequently execute a second one of the one or more code modules.

33. An apparatus for linking a set of code modules for execution, comprising:
means for determining one or more code modules to be executed, wherein the one or more code modules are one or more DLLs;
means for ascertaining a hierarchical order in which the one or more code modules are to be executed;
means for loading the one or more code modules to be executed; and
means for building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;
wherein the means for building a chain connecting the one or more code modules includes:
means for obtaining the first one of the one or more code modules;
means for determining whether the first one of the one or more code modules can subsequently execute a second one of the one or more code modules upon completion of execution of the first one of the one or more code modules; and
means for updating a branch table in the first one of the one or more code modules to identify an address at which the second one of the one or more code modules has been loaded such that the address of the second one of the one or more code modules is associated with the reference to the second one of the one or more code modules when it is determined that the first one of the one or more code modules can subsequently execute a second one of the one or more code modules.

34. An apparatus for linking a set of code modules for execution, comprising:

a processor; and a memory, at least one of the processor and the memory being adapted for:

determining one or more code modules to be executed, wherein the one or more code modules are one or more DLLs;

ascertaining a hierarchical order in which the one or more code modules are to be executed;

loading the one or more code modules to be executed; and building a chain connecting the one or more code modules such that the one or more code modules will automatically execute in the hierarchical order when a first one of the one or more code modules is executed, wherein each of the code modules responsible for calling a next one of the code modules in the chain includes a reference to the next one of the code modules in the chain, wherein an address in memory at which the next one of the code modules in the chain is loaded is associated with the reference to the next one of the code modules in the chain, wherein the chain does not include a main program and wherein building a chain enables the one or more code modules to execute without requiring a main program responsible for calling the one or more code modules;

wherein building a chain connecting the one or more code modules includes:

obtaining the first one of the one or more code modules;

determining whether the first one of the one or more code modules can subsequently execute a second one of the one or more code modules upon completion of execution of the first one of the one or more code modules; and when it is determined that the first one of the one or more code modules can subsequently execute a second one of the one or more code modules, updating a branch table in the first one of the one or more code modules to identify an address at which the second one of the one or more code modules has been loaded such that the address of the second one of the one or more code modules is associated with the reference to the second one of the one or more code modules.

* * * * *